United States Patent [19]

Karsh

[11] Patent Number: 4,796,125

[45] Date of Patent: Jan. 3, 1989

[54] OPTIMIZING THE POSITIONING OF A PAIR OF MAGNETIC HEADS RELATIVE TO SPACED TRACKS ON MAGNETIC TAPE

[75] Inventor: Herbert Karsh, Laguna Beach, Calif.

[73] Assignee: Eastman Kodak Company, Rochester, N.Y.

[21] Appl. No.: 83,138

[22] Filed: Aug. 10, 1987

[51] Int. Cl.$^4$ .............. G11B 5/58; G11B 5/52; G11B 21/10

[52] U.S. Cl. .............. 360/77.12; 360/78.02; 360/109

[58] Field of Search .............. 360/22, 75, 76, 77, 360/78, 106, 107, 109, 121, 70, 83, 90

[56] References Cited

U.S. PATENT DOCUMENTS

| | | | |
|---|---|---|---|
| 4,157,577 | 6/1979 | Porter, Jr. et al. | 360/77 |
| 4,204,234 | 5/1980 | Noble | 360/77 |
| 4,321,634 | 3/1982 | Lehureau | 360/77 |
| 4,454,549 | 6/1984 | Pennington | 360/77 |
| 4,485,418 | 11/1984 | Bremmer | 390/77 |
| 4,488,187 | 12/1984 | Alaimo | 360/77 |
| 4,556,920 | 12/1985 | Maeda | 360/77 |
| 4,575,775 | 3/1986 | Albrecht | 360/77 |

OTHER PUBLICATIONS

IBM/T.D.B., vol. 20, No. 1, Jun. 1977, pp. 38–41.
IBM/T.D.B., vol. 19, No. 9, Feb. 1977, pp. 3575–3576.
IBM/T.D.B., vol. 16, No. 5, Oct. 1973, p. 1379.

*Primary Examiner*—Raymond F. Cardillo
*Assistant Examiner*—Steven R. Garland
*Attorney, Agent, or Firm*—William F. Noval

[57] ABSTRACT

In a magnetic tape recorder in which information is recorded on a plurality of longitudinal tracks running parallel to the length of the tape, a technique is disclosed for optimizing the positioning of a pair of magnetic heads for simultaneously reading information recorded on a pair of spaced tracks on the tape. The pair of spaced magnetic heads are mounted for simultaneous movement across the width of the tape in small uniform steps. The output of each magnetic head is monitored as the heads are moved laterally across two reference tracks at the beginning of the magnetic tape. An optimal position for both heads is determined as the mean position of the region of travel during which the amplitude of the output signal from both heads exceeds a predetermined reference value. This technique is also applicable to magnetic disc drives.

3 Claims, 2 Drawing Sheets

OPTIMIZING THE POSITIONING OF A PAIR OF MAGNETIC HEADS RELATIVE TO SPACED TRACKS ON MAGNETIC TAPE

BACKGROUND OF THE INVENTION

This invention relates in general to magnetic storage devices in which information is recorded on a plurality of tracks. More particularly, this invention relates to a magnetic tape recorder in which information is recorded on a plurality of spaced longitudinal magnetic tracks running parallel to the direction of movement of the tape and in which a pair of magnetic heads are positioned for optimally reading information from a pair of magnetic tracks.

In magnetic storage devices, such as magnetic disc drives and magnetic tape recorders, information is recorded on a plurality of magnetic tracks which are written and read by means of one or more magnetic heads. The head(s) is laterally movable across the width of the tracks to access a specific track or tracks for reading or writing information. In such devices, difficulties are encountered in positioning a magnetic head relative to a recorded track in order to produce an optimal output signal. For example, in a magnetic tape recorder in which information is recorded on a plurality of longitudinal tracks on magnetic tape, variability of tape position due to tape slitting tolerances, guide tolerances, etc., makes it difficult to determine the exact position of a recorded track with sufficient accuracy to insure correct reading of the data. In order to obviate such difficulties it has been proposed to sense the edge of the tape by means of optical or magnetic sensors. This technique however, does not insure that the reading head will be positioned optimally over a recorded track, since the recording head may be mispositioned due to variation in manufacturing tolerances in the positioning mechanism, due to inaccurate tape tracking and due to errors in the relative location of a write/read head. Such positioning errors are exacerbated in magnetic tape recorders in which a pair of spaced magnetic heads read information simultaneously from a pair of spaced magnetic tracks on the tape.

Various techniques have been proposed for properly positioning a magnetic head with respect to a previously recorded magnetic track in magnetic disc devices. Thus, for example. U.S. Pat. No. 4,485,418, dated Nov. 27, 1984, entitled SYSTEM AND METHOD OF LOCATING THE CENTER OF A TRACK ON A MAGNETIC STORAGE DISC, inventor Robert A. Bremmer, discloses a system and method of positioning a magnetic transducer over the center of a previously recorded magnetic track on a rotating magnetic storage disc. As disclosed, the amplitude of a feedback signal from a magnetic transducer, as it is moved in increments across a recorded track, is measured and compared to a predetermined reference level. An offset measuring system connected to a computer measures the number of increments during which the feedback signal exceeds the reference level; a calculation is made to determine the center position of the magnetic track; and the transducer is moved to this position. There is no disclosure in this patent of any means for simultaneously positioning a pair of spaced magnetic heads relative to a pair of magnetic tracks, in order to produce optimal signals from both tracks. U.S. Pat. No. 4,575,775, dated Mar. 11, 1986; entitled MAGNETIC RECORDING DISC HAVING A SECTOR SERVO PATTERN FOR USE WITH A MULTIPLE ELEMENT HEAD; inventor David W. Albrecht, discloses a device including a magnetic disc containing prerecorded servo signals for use with a multiple element head. The pattern of servo signals are circumferentially alternated in radially spaced concentric tracks so that only one head, of a pair of magnetic heads, senses servo signals for data track following by both magnetic heads. The system disclosed in this patent is disadvantageous in requiring the use of prerecorded servo signals and in failing to provide optimization of positioning of both magnetic heads simultaneously relative to associated data tracks.

SUMMARY OF THE INVENTION

According to the present invention, there is provided, in a multitrack magnetic storage device (such as a magnetic tape recorder), a technique for simultaneously positioning a pair of magnetic heads relative to a pair of recorded tracks to produce optimal signals from both tracks. According to an aspect of the invention, the pair of magnetic heads are mounted for simultaneous movement in predetermined steps across the width of a pair of reference tracks recorded at the beginning of magnetic tape. The reproduced signals from both heads are compared to a reference level. The optimal position for both heads is determined as the mean position of the region of travel during which both signals exceeded the reference level.

BRIEF DESCRIPTION OF THE DRAWINGS

In the detailed description of the preferred embodiment of the invention presented below, reference is made to the accompanying drawings in which like elements are identified with like numbers.

DESCRIPTION OF THE PREFERRED EMBODIMENT

In the following description, a preferred embodiment of the present invention will be described as incorporated in a "serpentine" magnetic tape recorder which records information on magnetic tape on a plurality of longitudinal tracks which runs parallel to the direction of movement of the tape. Pairs of tracks are simultaneously recorded (written) and played back (read) as magnetic tape is transported back and forth between supply and takeup reels. The recorder includes a pair of magnetic read/write heads which are mounted for simultaneous movement across the width of the tape, transverse to the direction of tape movement. It will be appreciated that the present invention is also applicable to other devices in which information is recorded and played back from a plurality of parallel or concentric magnetic tracks on other magnetic storage media (such as magnetic discs, magnetic sheets, magnetic cards, and the like).

Figure 1:
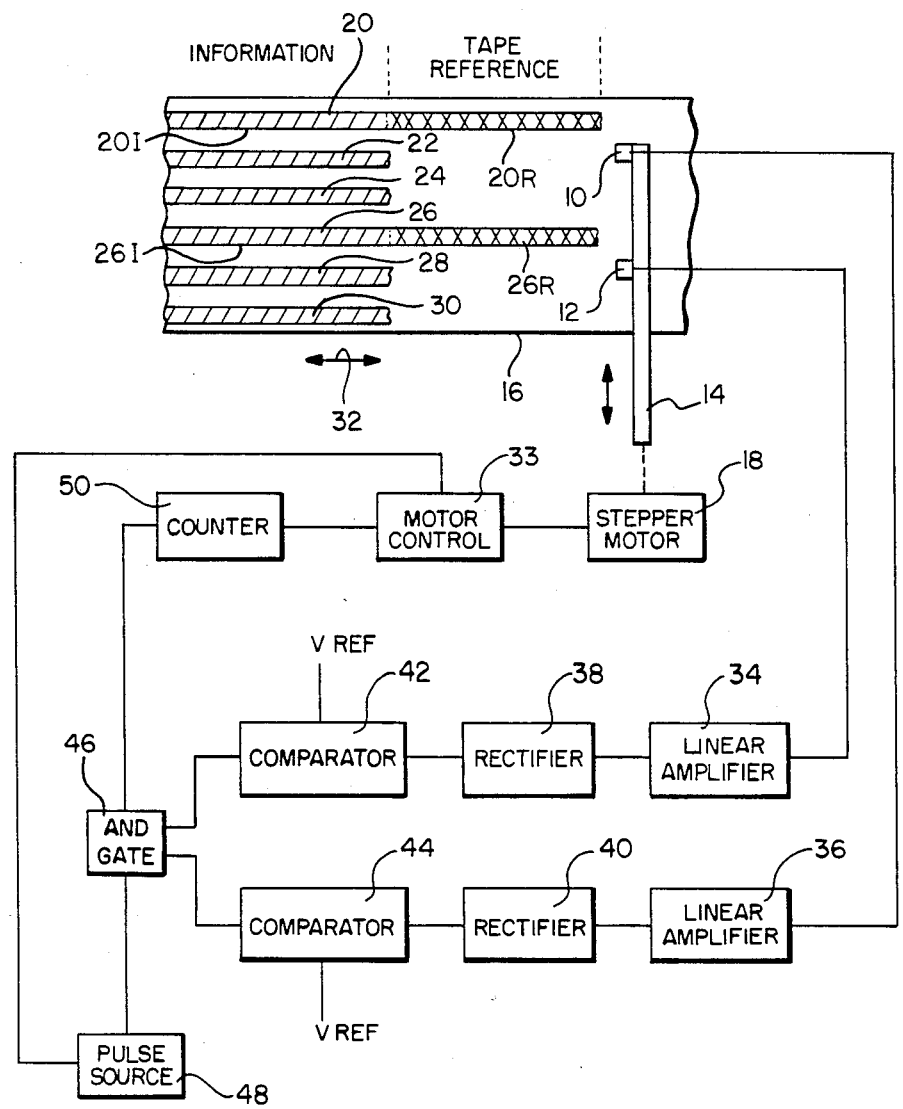
FIG. 1 is a block diagram of an embodiment of the present invention.
Figure 2:
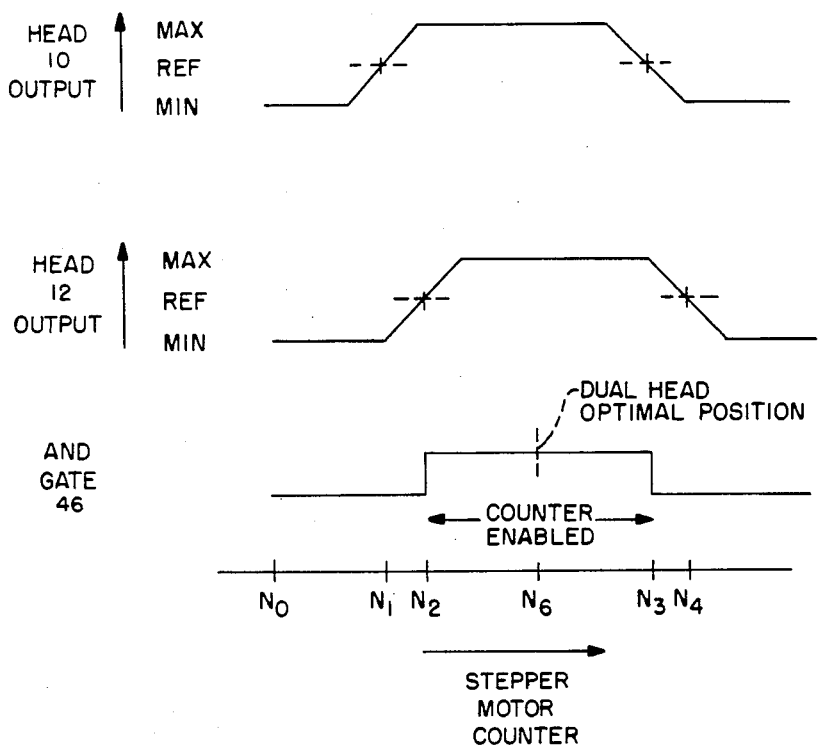
FIG. 2 shows waveform diagrams illustrating the operation of the embodiment of FIG. 1.

Referring now to FIGS. 1 and 2, there is shown a preferred embodiment of the present invention. As shown, a magnetic tape recorder includes a pair of spaced magnetic heads 10 and 12 mounted on an arm 14 which is movable laterally across magnetic tape 16. Recorded on tape 16 are a plurality of longitudinal magnetic tracks 20, 22, 24, 26, 28, and 30 which extend parallel to the direction of movement 32 of magnetic tape 16 and which contain magnetically recorded information. The magnetic tracks on tape 16 are written and read simultaneously in track pairs such as tracks 20, 26; 22, 28; and 24, 30. Tracks 20 and 26 have reference portions 20R and 26R recorded in advance of the information portions 20I and 26I.

According to the present invention, magnetic heads 10 and 12 are moved in incremental steps laterally across reference tracks 20R and 26R. The output signals from heads 10 and 12 are compared with a reference level signal to determine the position of heads 10 and 12, relative to tracks 20 and 26, which effects an optimal signal output from both heads. As tape 16 is moved in the direction of arrow 32, stepper motor 18 is actuated by motor control 33 to simultaneously move heads 10 and 12 in incremental steps across tape 16. The signals produced by heads 10 and 12 are applied to linear amplifiers 34 and 36, respectively. The amplified signals are then rectified by rectifiers 38 and 40. Comparators 42 and 44 compare the output signals from rectifiers 38 and 40 with a voltage reference signal VREF and produce signals which are applied to AND gate 46.

A Pulse source 48 supplies pulses both to AND gate 46 and to motor control circuit 33 which drives stepper motor 18. When the output signals, produced by heads 10 and 12, simultaneously exceed VREF, AND gate 46 gates through pulses from source 48 to counter 50. Counter 50 counts the number of steps across tracks 20 and 26 during which the output from both heads exceeds VREF. Motor control control 33 determines the optimal position for heads 10 and 12 relative to tracks 20 and 26 as the mean position of this region of travel. This position is then used as a reference to control the optimal positioning of heads 10, 12 relative to tracks pairs 22, 28 and 24, 30.

The operation of the embodiment of FIG. 1 is more clearly illustrated with respect to the waveforms diagrams of FIG. 2. As shown, the output signals from heads 10 and 12 are plotted against the position (in stepper motor counts) of heads 10 and 12 across the width of tracks 20, 26 relative to a starting point $N_0$. The output signal from head 10 exceeds the VREF level at a position $N_1$, whereas the output signal from head 12 exceeds VREF at position $N_2$. The output signal from head 10 continues to exceed VREF, until position $N_3$, after which it drops below VREF. The position $N_4$ at which the output signal from head 12 drops below VREF, is past position $N_3$. According to an aspect of the present invention, AND gate 46 passes pulses from source 48 to counter 50 only when the output signals from both head 10 and head 12 exceeds VREF (i.e., from position $N_2$ to position $N_3$).

The optimal position for both heads 10 and 12, is determined by calculating the mean position $N_6$ between positions $N_2$ and $N_3$. This determination is made by motor control circuit 33 which causes stepper motor 18 to position heads 10 and 12 at position $N_6$ in order to effect simultaneous production of optimal output signals from both track 20 and track 26. This position is used as a reference to optimally position heads 10 and 12 relative to other pairs of tracks such as 22, 28 and 24, 30.

It will be appreciated, that although, in the example of FIG. 2, the output from head 10 is shown as leading the output from head 12, the output from head 10 may also be coincident with or lagging the output from head 12. In either case, the optimal position for heads 10, 12 is determined in a similar manner.

It will also be appreciated that the embodiment of the present invention described above is also applicable to the positioning of a pair of magnetic heads relative to concentric recorded tracks on a magnetic disc. Moreover, the present invention is applicable to the optimal positioning of a plurality of heads greater than two. In such case, the output signal from each of the plurality of heads is compared to a reference level signal and the optimal position for the plurality heads is determined by calculating the mean position of the region of travel during which all of the output signals are greater than the reference level signal.

The invention has been described in detail with particular reference to preferred embodiments thereof, but it will be understood that variations and modifications can be effected within the spirit and scope of the invention.

What is claimed is:

1. In magnetic storage apparatus including a pair of magnetic heads for simultaneously reading information recorded on spaced magnetic tracks of magnetic media, the invention comprising:
   means for simultaneously moving said pair of magnetic heads laterally across said pair of spaced magnetic tracks on said magnetic media;
   means for comparing the output signal from each of said pair of magnetic heads with reference level signal as said heads are moved by said moving means;
   means for determining the optimal position for both of said heads relative to said pair of tracks by calculating the mean position of the region of travel during which the output signal from each of said heads simultaneously exceeds said reference level; and
   means for controlling said moving means to position said pair of heads at said optimal position.

2. In a magnetic tape apparatus including a pair of magnetic heads for simultaneously reading information recorded on a pair of longitudinal magnetic tracks on magnetic tape, said tracks extending parallel to the direction of movement of said tape, the invention comprising:
   means for simultaneously moving said pair of magnetic heads laterally across said pair of magnetic tracks on said magnetic tape;
   means for comparing the output signal from each of said pair of magnetic heads with a reference level signal as said heads are moved by said moving means;
   means for determining the optimal position for both of said heads relative to said pair of tracks by calculating the mean position of the region of travel during which the output signal from each of said heads simultaneously exceeds said reference level; and
   means for controlling said moving means to position said pair of heads at said optimal position.

3. The invention of claim 2 wherein said moving means includes stepper motor means; and wherein said determining means includes means for counting the number of steps of said stepper motor in the region of travel during which the output signal from each of said heads simultaneously exceeds said reference level and and for calculating the mean position from said number.

* * * * *